United States Patent [19]
de Boer et al.

[11] 3,947,319
[45] Mar. 30, 1976

[54] NUCLEAR REACTOR PLANTS AND CONTROL SYSTEMS THEREFOR

[75] Inventors: Gerard Arnold de Boer, Leiden; Max de Hex, Leiderdrop, both of Netherlands

[73] Assignee: N.V. Neratoom, The Hague, Netherlands

[22] Filed: Apr. 5, 1973

[21] Appl. No.: 348,206

[30] Foreign Application Priority Data
Apr. 10, 1972  Netherlands.................. 7204745

[52] U.S. Cl..................................... 176/65; 176/60
[51] Int. Cl.² ........................................... G21D 5/08
[58] Field of Search.............................. 176/65, 60

[56] References Cited
UNITED STATES PATENTS

| | | | |
|---|---|---|---|
| 3,247,069 | 4/1966 | Powell et al. | 176/65 |
| 3,253,994 | 5/1966 | Kagi | 176/65 |
| 3,255,084 | 6/1966 | Doroszlai | 176/60 |
| 3,341,422 | 9/1967 | Gilbert | 176/60 |
| 3,421,978 | 1/1969 | Gollion et al. | 176/65 |
| 3,434,924 | 3/1969 | Pouderoux | 176/65 |
| 3,578,563 | 5/1971 | Strohmeyor, Jr. | 176/65 |

FOREIGN PATENTS OR APPLICATIONS

| | | | |
|---|---|---|---|
| 1,444,129 | 5/1966 | France | 176/65 |

*Primary Examiner*—Verlin R. Pendegrass
*Assistant Examiner*—C. T. Jordan
*Attorney, Agent, or Firm*—John P. Snyder

[57] ABSTRACT

A nuclear reactor plant comprising at least two hydraulically separated but thermally interconnected heat conveying circuits, of which one is the reactor circuit filled with a non-water medium and the other one is the water-steam-circuit equipped with a steam generator, a feed water conduit controlled by a valve and a steam turbine, and a control system mainly influenced by the pressure drop caused in said feed water conduit and its control valve and having a value of at least 10 bars at full load.

12 Claims, 2 Drawing Figures

NUCLEAR REACTOR PLANTS AND CONTROL SYSTEMS THEREFOR

The invention relates to a nuclear reactor plant intended for supplying heat to a steam generator, which plant comprises at least two circuits for conveying this heat, these circuits being hydraulically separated but thermally coupled to each other by means of heat exchangers, specifically one water-steam-circuit equipped with a steam generator, a feed water pump which is included in a feed water conduit with a feed controlling valve as well as with a steam turbine, and one reactor-circuit equipped with a primary circulation pump and charged with a non-water, heat-transferring medium, in such a way that the heat exchangers in the operative state exhibit a relatively small pressure drop.

The control systems hitherto known for such a reactor system have been marked by a high degree of complexity. Applicant has arrived at the insight that it is also possible to attain very good results with a control system of very simple design.

According to the invention, this aim is reached by dimensioning the feed water conduit with the feed water control valve contained therein in such a way that the pressure drop along this feed water conduit at full load is greater than 10 bars. In proportion as the pump characteristic is steeper, this pressure drop can become somewhat smaller without any objection. If a pump is selected having a steep curve indicating the correlation between lift and output, this will furthermore provide the advantage of such a pump being lower in price. In a given design, use may be made, for example, of a feed pump marked by an almost linear correlation between lift and output.

This curve may be actually curved or may be a virtually straight line which, at a constant pump speed, indicates the correlation between lift (=pump pressure) and output, and is in this connection called steeper in proportion as, with a given drop in output, the lift of the pump rises. This curve is in the following sometimes designated as "pump characteristic."

Since it is sometimes not a simple matter to realize a fairly appreciable pressure drop in a control valve, use may be made, if required, of a hydraulic turbine. In this liquid turbine, at least part of the pressure drop can be realized which is necessary for the stability of the system. An additional advantage of this is that energy is recovered in the liquid turbine. The liquid turbine, which often needs to comprise only one step, can advantageously be accommodated in the housing of the feed water pump, the blade wheel of this turbine being fastened on the rotor of the pump. A bypass valve, arranged in a bypass of the turbine, in such case regulates the amount of feed water flowing through the turbine.

In many cases, the aforementioned hydraulically separated but thermally coupled circuits are separated from each other not only by heat exchangers but also by an additional heat-transferring circuit. This measure will be taken specifically in the case of a nuclear reactor plant provided with a sodium-cooled reactor. In such a case, the precaution is taken of providing an additional heat-transferring circuit for hydraulically separating the primary circuit and the steam-water-circuit; said additional or so-called secondary circuit being equipped with a secondary circulating pump and containing a non-water heat-transferring medium. The three hydraulically separated circuits then are thermally coupled by means of an intermediate heat exchanger for conveying heat from the primary or reactor-circuit to the secondary circuit and the steam generator. For a correct understanding of the following, it is pointed out that a sodium-cooled reactor, on account of the secondary cooling circuits with prolonged dead times (time lags) for heat transportation, gives rise to processes which are difficult to control.

In this respect, it has been considered that the use of a steam-water-separator in the sodium-heated steam generator presents advantages with respect to the control of temperature in the steam generator. A consequence of using such a water-steam-separator, however, is that this steam generator gives rise to the formation of a positive feedback between live steam pressure and feed water flow. An important element of the present invention is the insight that this undesired feedback can be simply eliminated by taking the required measures for the pressure drop through the feed water conduit and the control valve, to have a value of at least 10 bars.

The aforementioned steam separator is necessary, because the evaporator of the steam generator produces somewhat wet steam. The excess water is separated from the mixture in the steam-water-separator, so as to return it to the feed water preheaters.

It has been found in practice that several factors are decisive for the stability of the control system of the steam generator. This steam generator system, consisting of a feed water pump, a control valve, an evaporator, a steam-water-separator, a superheater and a turbine-inlet-valve exhibits — without the control circuits — a negative feedback effect on account of the thermal behaviour thereof. In certain circumstances, however, the same system exhibits a positive feedback effect on account of the hydraulic behaviour.

The presence of a negative thermal feedback (back coupling) can be observed by an increase in the flow of feed water through the evaporator. Since, in this case, more water must be heated to boiling temperature, less steam will be produced, resulting in a drop of the flow of steam through the superheater. Since the conditions of steam admission to the superheater through the steam water separator must be kept constant, the power transmitted from the sodium to the steam is proportional to the quantity of steam flowing per unit of time through the superheater. A reduced steam production gives a higher sodium outlet temperature at the superheater, causing more power to become available for producing steam in the evaporator. As a result, the entire system will rapidly find its new state of equilibrium.

The fact, however, that a positive hydraulic feedback can also arise can be understood by realizing that a change occurs in the position of the turbine inlet valve. An increase in the valve passage of the turbine causes an increase in the amount of steam flowing through the steam conduit, as well as a pressure drop in this steam conduit, in the superheater and in the steam-water-separator. Now the mass flow through the evaporator is directly proportional to the square root of the pressure difference that prevails between the steam-water-separator and the feed water pump. This pressure difference increases as a result of the decrease of pressure in the steam-water-separator. The eventual increase of the feed water flow causes a decrease in the steam flow through the superheater, which in turn causes a decrease of the live steam pressure. In this manner, variations can occur in the steam pressure without leading to a new stable state.

It is a fortunate circumstance that the increase in the amount of feed water likewise produces a decrease of the feed water pump pressure as a result of the pressure output characteristic of this pump. If this decrease is of the same order of magnitude as the decrease in pressure of the steam-water-separator, a new, stable adjustment can indeed be reached in operation.

The output characteristic of the great majority of feed water pumps exhibits a slight inclination at low outputs. Accordingly, the opposing effect is too small for our purpose. Measures must therefore be taken for the increase in feed water flow, resulting from the pressure drop in the steam-water-separator, to be reduced at low loads. This can be done in a simple manner by introducing an extra pressure drop or resistance in the feed water conduit. According to calculations, a pressure drop of 20 bars at a load of 30 percent is sufficient for ensuring a stable behaviour of the steam generator. This pressure drop should be about 10 bars at full load for attaining the same stabilizing effect.

According to the invention, the control system is furthermore so designed that a control impulse coming from the measured amount of water separated in the external water separator gives an impulse to the feed water control valve.

A steam generator system equipped with such a control circuit exhibits the following behaviour: A drop of the live steam pressure owing for instance to a greater turbine steam flow, causes an increase in the feed water flow. This causes an increase in the draining of condensate collected in the steam-water-separator. The control circuit over this condensate drainage will slightly close the feed water valve, resulting in a decrease of the feed water flow as well as in a decrease of the steam condensate drainage and an increase in pressure, because of an increase both in the flow of steam to the superheater and the supply of heat. This pressure increase brings about a further decrease of the feed water flow, and thus a still further decrease in the drainage from the water separator. This decrease will again induce the control circuit to open the feed water valve still further, until a correct and stable state has fairly rapidly been established.

Now if the coupling factor between the live steam pressure changes and the change in the drainage of condensate from the steam water separator is too high, this control circuit can become unstable. This can be remedied by reducing the coupling factor by increasing the pressure drop in the feed water conduit. It has already been explained in the above that other considerations have also led to the finding that a pressure drop of 20 bars will ensure at all loads a stabilizing dynamic behaviour of this control circuit.

According to a preferred embodiment of the invention, the set-point controls of the regulators for the tertiary and for the primary circuit are disconnected, whereby the process has become well regulable.

This is preferably accomplished by taking such measures that a control impulse coming from the measured steam pressure, or the measured amount of steam per unit of time, or a combination of these measured values, corrects the mass flow of the secondary circuit, by influencing the speed of the secondary circulating pump.

This measure can be effectively supplemented by causing a control impulse from the mass flow measured in the secondary circuit to correct the mass flow of the reactor circuit by influencing the speed of the primary circulating pump. Finally, it has been found effective to cause a control impulse from the mass flow measured in the secondary circuit to adjust the set point of the reactor temperature regulator.

With the use of the control method described, according to which the reactor outlet temperature changes as a function of load, the temperature of the live steam does not have to be separately regulated. Calculations have shown that this temperature during very fast load changes, such as, for example, 10 percent of load in 5 seconds, changes by only about 6°C, during a very short time, approximately 30 seconds.

The control system according to the invention can be load-following as well as load-forcing. According to the latter method, the secondary sodium pump is controlled with a desired power signal, and the live steam pressure is constantly controlled with the turbine valve, so-called prepressure (initial pressure) control.

With the aid of the following figures, two embodiments of the invention will be explained in further detail.

In these figures.

Figure 1:
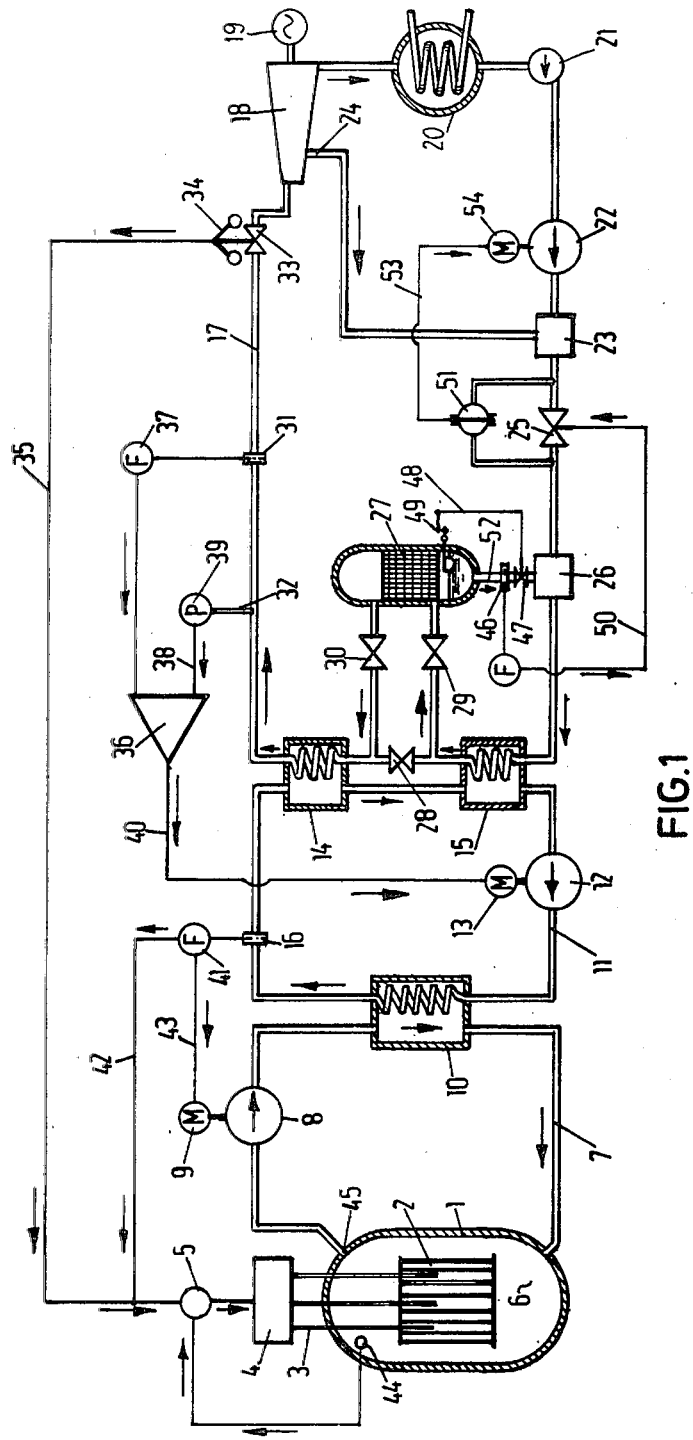
FIG. 1 is a diagrammatical view of a nuclear reactor installation, equipped with three circuits, use being made of the control system according to the invention.

In FIG. 1, the numeral 1 represents a nuclear reactor, provided with a core 2, inside which control rods 3 are accommodated. The control rods are moved with the aid of a control rod driving mechanism 4, which in turn is influenced by a control apparatus 5. The contents 6 of the reactor vessel are included in the primary circuit 7. This furthermore comprises a primary circulating pump 8 which is driven by an electric motor 9 with speed regulator. The medium, having been heated in the reactor vessel 1 by passing along the core 2, is pumped by the pump 8 to the heat exchanger 10. This heat exchanger transfers the heat to the secondary circuit 11 which is likewise provided with a pump 12 driven by an electric motor 13 with speed regulator. The secondary circuit comprises successively a superheater 14 and an evaporator 15. Before the superheater, a measuring flange 16 is included which allows the amount of flow of secondary medium to be measured. The heat exchangers 14 and 15 finally transfer the heat to the steam-water-circuit 17 which includes a steam turbine 18 which drives an electric generator 19. The exhaust steam of the steam turbine 18 is condensed in the condenser 20 and finally pumped through a condensate pump 21. A feed water pump 22 pressurizes this condensate so as to force it back to the steam generator. A number of feed water preheaters, not shown in the drawing, can be arranged between the condensate pump and the feed water pump. Such a feed water preheater is 23, which receives steam from the draining point 24 situated in the high pressure part of the steam turbine 18. After the feed water preheater 23, the feed water conduit contains the feed water control valve 25. This is followed by another preheater 26, which collects the condensate that has been separated in the external water separator 27. During normal operation, the valve 28 is closed, and the valves 29 and 30 are open. The steam water circuit likewise comprises a measuring flange, i.e. the flange 31 which measures the amount of steam which is conveyed through the main steam conduit to the turbine 18. The number 32 indicates a measuring point for measuring the steam pressure. The main shutoff valve of the turbine is indicated by 33, it being symbolically shown that this valve is influenced by a speed regulator 34.

Control of the installation shown is performed as follows: A control impulse line 35, emitting a signal from a value which is a measure for the load, is supplied to the control circuit 5 of the reactor. The measured steam production in point 31 is supplied by the flow meter 37 to the control element 36. The same control element also receives an impulse through line 38 which comes from the pressure measurement 39. The control impulse emitted by the element 36 is conveyed to the electric motor 13 so as to adjust the pump 12 to the correct speed. This is accomplished with the aid of the control impulse line 40. The measuring flange 16, included in the secondary circuit 11, conveys an impulse to the flow meter 41. Besides giving an impulse through line 42 to the control circuit 5 of the reactor, it sends an impulse to the speed control of the pump motor 9 of the primary circulating pump 8 so as to regulate the speed of this pump. This is done with the aid of the impulse line 43. The control circuit 5, indicated symbolically in the figure, operates in such a way that it controls an outlet temperature at a point 44 near the outlet 45 of the reactor at a constant value with the aid of the control rods 3. The value to which this outlet temperature is adjusted can be influenced both by the impulse line 35 and by the impulse line 42.

The line 52, besides comprising a measuring flange 46, also contains a control valve 47. This valve, operating by way of the control circuit 48 and the water level control 49, keeps the liquid level in 27 at a constant value. The measuring flange 46 conveys control impulses to the valve 25 by way of 50. There is a pressure drop across this valve 25, the magnitude of which is measured by the measuring element 51, which causes the result of measurement to act by way of line 53 upon the speed of the motor 54 which drives the pump 22.

Figure 2:
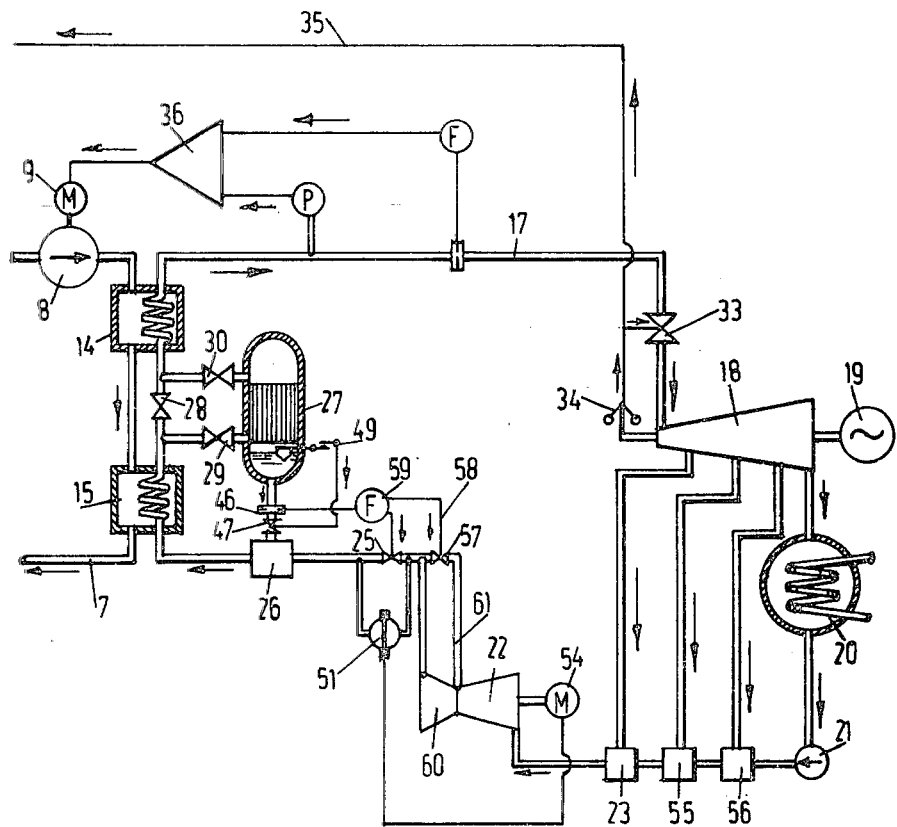
FIG. 2 is a variant of FIG. 1 for an installation equipped with two circuits and the feed water pump being provided with a turbine step. (This figure only indicates the change in the right-hand part of the diagram).

Shown in FIG. 2 is a portion of the diagram according to FIG. 1, but designated as a variant. The reactor circuit 7 with the nuclear reactor 1 is not entirely shown, because this has undergone no change with respect to FIG. 1. The parts of the diagram already discussed with regard to FIG. 1 are indicated in FIG. 2 by the same reference numerals.

Shown here is an assembly with two circuits, i.e. the reactor circuit 7 and the steam-water-circuit 17, 21, 22, 26, 15, 14. The turbine 18 has three draining points for the feed water preheaters 23, 55 and 56. The feed water pump 22 is combined with a hydraulic turbine 60, through which part of the amount of feed water can flow. The magnitude of this partial amount is set with the bypass valve 57 contained in a bypass 61 of the turbine step. With the valve 57 entirely opened, only some of the feed water flow passes through the turbine 60, cooling this. With the valve 57 closed, the entire flow passes through turbine 60. The pressure drop which is required for control reasons can now be brought about economically and simply in the turbine 60, so that the valves 57 and 25 only need to dissipate a small amount of energy by throttling.

What we claim is:

1. A nuclear reactor plant intended for supplying heat to a steam generator comprising a primary circuit filled with a heat-transferring medium which is different from water and equipped with at least a nuclear reactor, a pump and the primary section of a heat exchanger; a secondary circuit filled with a heat-transferring medium which is different from water and equipped with at least the secondary section of said heat exchanger, the primary section of said steam generator and a second pump; a tertiary circuit filled with water and steam and equipped at least with the secondary section of said steam generator, a steam turbine with controllable shut-off valve, a condenser with a condensate pump, a feed water pump and a feed water conduit provided with a controllable feed water valve and extending from the pressure side of the feed water pump to said steam generator; and a first regulating means to control the mass-flows in said primary circuit and said secondary circuit in a manner dependent on the steam power supplied to the turbine and wherein said feed water conduit and the devices forming part thereof are so constructed and dimensioned as to cause at full load between the ends of the feed water conduit a pressure difference of at least 10 bars.

2. A nuclear reactor plant according to claim 1, in which the feed water conduit and the devices forming part thereof are so constructed and dimensioned as to cause at a load of 30 percent between the ends of the feed water conduit a pressure difference of at least 20 bars.

3. A nuclear reactor plant according to claim 1 wherein said feed water conduit includes a liquid turbine for bringing about the realization of at least part of said pressure difference.

4. A nuclear reactor according to claim 1 in which said steam generator includes an evaporator and a superheater and wherein there is provided, between said evaporator and said superheater, a water separator, the water discharge conduit of which contains a controllable valve and is connected with the feed water conduit, and in which there are provided a second regulating means to control said valve contained in the water discharge conduit of said water separator in a manner dependent on the position of the water level in said separator and a third regulating means to control the feed water valve in a manner dependent on the mass flow in said water discharge conduit.

5. A nuclear reactor plant according to claim 4, in which there is provided a fourth regulating means to control the feed water pump in a manner dependent on the pressure difference across the feed water valve.

6. A nuclear reactor plant according to claim 1, in which said first regulating means is so constructed and connected as to control the mass flow in the secondary circuit in a manner dependent on the quantity of steam supplied per unit of time to the turbine and as to control the mass flow in the primary circuit in a manner dependent on the mass flow in the secondary circuit.

7. A nuclear reactor plant according to claim 6, in which said first regulating means is also so constructed and connected as to control the mass flow in the secondary circuit in a manner dependent on the pressure of said steam.

8. A nuclear reactor plant according to claim 6, in which there are provided a regulating means to maintain the temperature of the medium flowing and the temperature of the reactor constant at a certain value, and a regulating means to adjust said certain value in a manner dependent on the mass flow in the secondary circuit.

9. A three-circuit nuclear reactor plant intended for supplying heat to a steam generator, said plant comprising:
- a primary circuit containing a non-water, heat-transferring medium and including a nuclear reactor, a primary pump and a primary section of a heat exchanger;
- a secondary circuit connected between said primary circuit and said steam generator, and containing a non-water, heat-transferring medium, and including the secondary section of said heat exchanger and a secondary pump;
- a tertiary circuit filled with water and steam, connected to said steam generator, and including a steam turbine with controllable shut-off valve, a condenser with condensate pump, a feed water pump having a pressure side and a steam generator side, and a feed water conduit extending between said pressure side and said steam generator; and
- control means connected to said primary, secondary and tertiary circuits for controlling the mass flow in said primary circuit and said secondary circuit in a manner dependent on the quantity of steam supplied to said turbine in said tertiary circuit; and
- wherein said tertiary circuit additionally includes means in said feed water conduit for introducing a large flow resistance therein so as to cause a pressure difference not less than ten bars at full load to be imposed along the length of said feed water conduit.

10. A nuclear reactor plant as recited in claim 9 wherein said flow resistance introduced in said feed water conduit by the means last mentioned causes said pressure difference to be not less than 20 bars at 30 percent load.

11. A nuclear reactor plant as recited in claim 9 wherein said last mentioned means is a hydraulic turbine.

12. A nuclear reactor plant for the supply of heat to a steam generator, said plant comprising three hydraulically separated circuits which are adapted to convey said heat and are thermally coupled to each other, one of said circuits being a water-steam-circuit which is equipped with a steam generator, a feed water conduit provided with a feed water control valve and a steam turbine, another one of said circuits being a primary circuit which includes a reactor and which is equipped with a primary circulation pump and is filled with a heat-transferring medium which is different from water, the remaining circuit constituting a secondary circuit which hydraulically separates the primary circuit and the water-steam-circuit and contains a heat-transferring medium which is different from water, a secondary circulation pump being provided in said secondary circuit, a first heat exchanger which thermally couples the primary reactor circuit to the secondary circuit, a second heat exchanger thermally coupling said secondary circuit to said water-steam-circuit and providing an evaporator for said water-steam-circuit, and a third heat exchanger thermally coupling said secondary circuit to said water-steam-circuit and providing a superheater for said water-steam-circuit, said superheater and said evaporator constituting together the said steam generator, said water-steam-circuit including a water separator connected between said evaporator and said superheater and being adapted to separate water from the water-steam-mixture produced in said evaporator and to return said water to the feed water conduit, and in which the plant is so controlled as to have the feed water control valve being controlled itself by an impulse coming from the measured amount of water separated in said external water separator said second and third heat exchangers causing during operation a relatively small pressure drop and both said feed water conduit and said feed water control valve being so dimensioned as to ensure that at full load the pressure drop caused by them is greater than 10 bars.

* * * * *

UNITED STATES PATENT OFFICE
CERTIFICATE OF CORRECTION

Patent No. 3,947,319      Dated March 30, 1976

Inventor(s) Gerald A. De Boer et al

It is certified that error appears in the above-identified patent and that said Letters Patent are hereby corrected as shown below:

On cover sheet in item [75] "Max de Hex" should read -- Max de Hes --.

Signed and Sealed this eighth Day of June 1976

[SEAL]

Attest:

RUTH C. MASON
Attesting Officer

C. MARSHALL DANN
Commissioner of Patents and Trademarks